(12) United States Patent
Palmer et al.

(10) Patent No.: US 6,598,924 B2
(45) Date of Patent: Jul. 29, 2003

(54) HOLDING AND MOUNTING DEVICE AND METHOD FOR A FRONT/REAR PANEL OF A VEHICLE

(75) Inventors: Eberhard Palmer, Vahingen (DE); Thomas Ritz, Aidlingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/102,210

(22) Filed: Mar. 21, 2002

(65) Prior Publication Data

US 2002/0149221 A1 Oct. 17, 2002

(30) Foreign Application Priority Data

Mar. 22, 2001 (DE) .......................... 101 14 018

(51) Int. Cl.[7] .............................................. B62D 25/08
(52) U.S. Cl. .................... 296/29; 296/191; 296/203.02; 296/203.04
(58) Field of Search .................. 296/29, 191, 193–195, 296/198, 203.02, 203.04

(56) References Cited

U.S. PATENT DOCUMENTS

| | | | | |
|---|---|---|---|---|
| 5,061,108 A | * | 10/1991 | Bien et al. ............... | 296/198 X |
| 6,209,940 B1 | * | 4/2001 | Jocher et al. ................. | 296/29 |
| 2002/0117875 A1 | * | 8/2002 | Hoffner et al. ............. | 296/194 |

FOREIGN PATENT DOCUMENTS

| | | | |
|---|---|---|---|
| DE | 3740787 A1 | 6/1989 | |
| DE | 19803402 A1 | 8/1998 | |
| EP | 0253989 | * 1/1988 | ................. 296/194 |
| EP | 0417654 A1 | 3/1991 | |

* cited by examiner

Primary Examiner—Dennis H. Pedder
(74) Attorney, Agent, or Firm—Crowell & Moring LLP

(57) ABSTRACT

A device is used for holding and mounting a front/rear panel to a side component of a vehicle, for purposes of reinforcing and housing vehicle aggregates in the front/rear panel of a vehicle; in order to allow a simple mounting of the front panel to a side component. The panel is provided with a mounting profile with clamping brackets that can be attached to corresponding clamping elements of a guide rail in the side component.

22 Claims, 5 Drawing Sheets

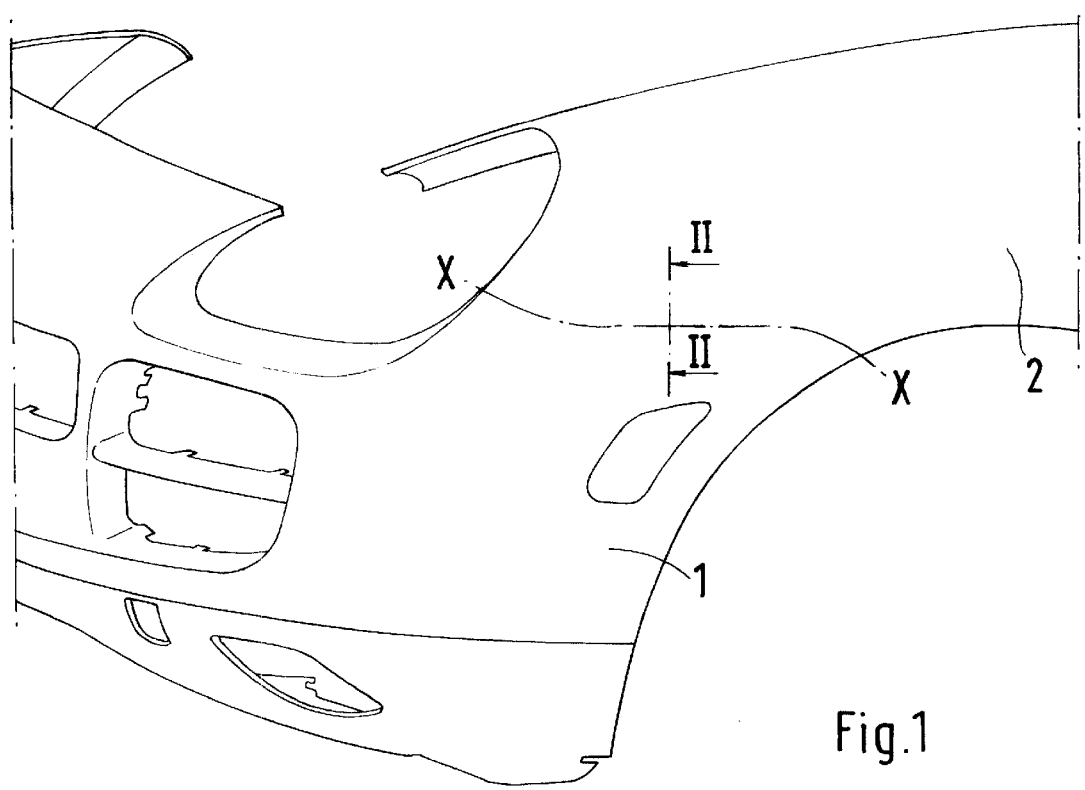
Fig.1
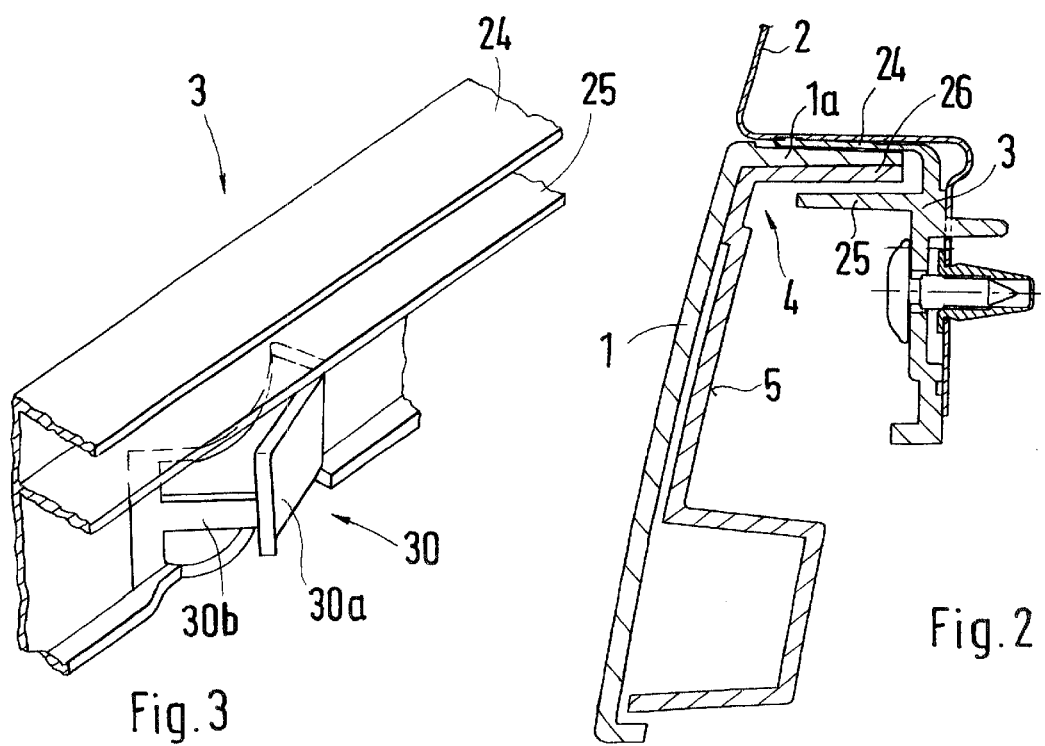
Fig.3
Fig.2

HOLDING AND MOUNTING DEVICE AND METHOD FOR A FRONT/REAR PANEL OF A VEHICLE

BACKGROUND AND SUMMARY OF THE INVENTION

This application claims the priority of German Patent Document No. 101 14 018.5, filed Mar. 22, 2001, the disclosure of which is expressly incorporated by reference herein.

The invention relates to a holding and mounting device for a front/rear panel of a vehicle.

A strip-type mounting component for connecting a preformed component to a body frame is known from DE 198 03 402 A1. In addition a guide rail for mounting a formed component to a frame wall is also known from EP 0 417 654 A1. To accomplish this, the guide rail is equipped with two crosspieces positioned a certain distance from one another, between which one part of the preformed component, such as a bumper, is held. Furthermore, a molded bumper mounting bracket that is used to support a bumper cover is also known from DE 37 40 787 A1.

An object of the invention is to provide a holding and mounting device to mount a front/rear panel of a vehicle on a side component in a simple manner to ensure a secure connection between the front/rear panel and the side component. The front/rear panel can be further equipped with arrangements designed to hold aggregates to the vehicle.

This objective is attained in accordance with the embodiments of the invention as described below.

One of the advantages of the invention is that a structural support component is positioned in each of the corners of the front/rear panel, which effects both a reinforcement and a secure mounting to the fender or to the side component of the body of the vehicle. In addition, the structural support component may also be used to mount a wheel housing or as a bearing for vehicle aggregates. The device is suitable for use as both, a front and a rear panel. Hereinafter, however, the device shall be referred with respect to the front panel only.

This is achieved in that the front panel is connected to an inner structural support component. This inner structural support component has a grid structure and is provided with an upper, strip-type mounting profile for the side component, and mounting brackets on the face to accommodate a wheel housing liner. In the inner structural support component, there are mounting projections for the housing of a directional signal, receptacles for a windshield washing/wiping assembly, and positions for mounting cable bundles via screws.

The front panel, in conjunction with the structural support component, forms a pre-mountable unit, which is essentially separated from the front panel to reduce noise. To this end, the structural support component is connected to the front panel via a support section and via tabs and a brace. The support section is U-shaped in its cross section, and extends at least over the entire length of the structural support component. The outer part of the support unit is connected to an angled section of the front panel. When the components have been installed, the crosspiece of the support section rests against the inner surface of the front panel. In addition, the structural support component is held in place along the lower edge of the front panel via tabs, on fusable projections of the structural support component. Attaching the structural support component using the support section and additional connections makes the front panel more rigid.

The front panel is attached to the side component via the strip-type support section, which is inserted into the guide rail of the side component. To this end, the support section is equipped with clamping brackets that project into the profiled crosspiece, each of which has a projecting angled surface with a longitudinal slit. The guide rail in the side component, with corresponding clamping elements, can be placed in the clamping brackets. The clamping elements are equipped with an angular running tongue that is formed on a frame corresponding to the angular surface adjustment of the clamping bracket.

Further, the guide rail is equipped with opposing legs, which hold between them the outer leg of the mounting profile, with the angled section of the front end panel.

In another version of the invention, one of the sides of the guide rail may also have a number of tabs, positioned opposite a continuous side. Between the tab and the side, the outer leg of the mounting profile is held with the angled piece of the front panel.

The structural support component is supported at its front side in a projecting rib, with an area designed to hold the wheel liner, and the wheel liner. The structural support component are fastened to this rib via a mounting screw. The advantage of this is that the structural support component can be supported by the rib, while allowing a simple mounting of a wheel liner.

The structural support component is further equipped with an opening that corresponds to an outer opening in the front panel. The opening is partially enclosed by a crosspiece and is open at the front. In the opening, the housing for a directional signal may be positioned. The housing can be attached via screws in two recessed areas, set apart from one another, at the end of the structural support component. The structural support component further has an external opening corresponding in the front panel to a partially rimmed and open outlet on the face side in which the directional signal housing is seated. The housing can then be attached by screws through two recessed seats of the structural support component. Such design for the structural support component allows the housing for the directional signal to be integrated into the structural support component and to be pre-installed.

Overall, according to an embodiment of the invention, the structural support component can be used to provide bracing and to allow a simple method of attachment to the side component. It also enables the pre-installation of brackets and the mounting of aggregates and cables, etc.

One exemplary structural example of the invention is illustrated in the drawings, and will be described in greater detail below.

Other objects, advantages and novel features of the present invention will become apparent from the following detailed description of the invention when considered in conjunction with the accompanying drawings.

BRIEF DESCRIPTION OF THE DRAWINGS

FIG. 1 is a graphical representation of the front panel mounted on the side component and/or on the fender, FIG. 2 is a section view along the line II—II through the point of connection, with its edge along X-X, FIG. 3 is a section of a guide rail with a mounting element.

DETAILED DESCRIPTION OF THE DRAWINGS

Figure 4:
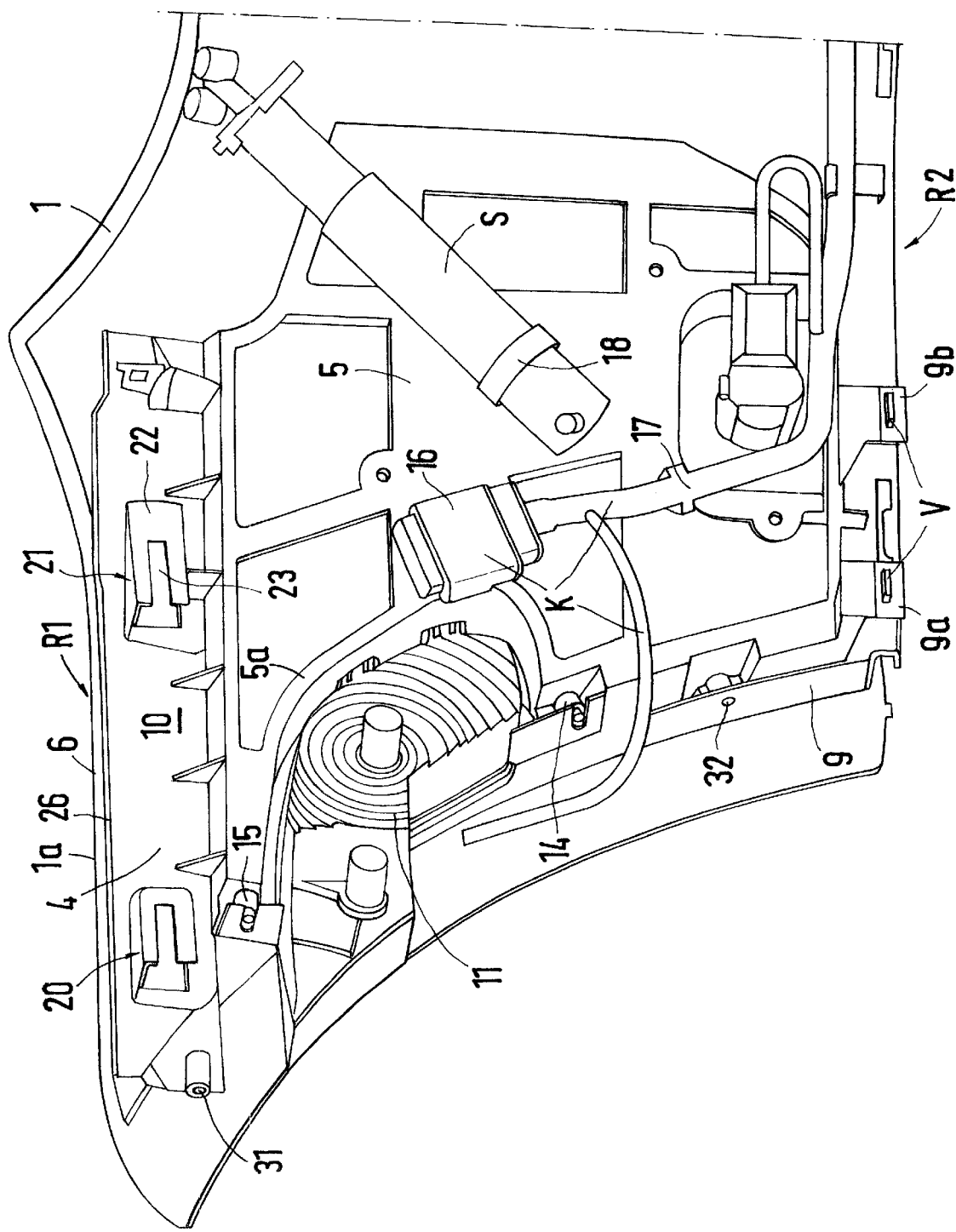
FIG. 4 is an inside view of a structural support component of the front end panel, with cable bundles, a housing for a directional signal, and a headlight washer/wiper assembly.
Figure 5:
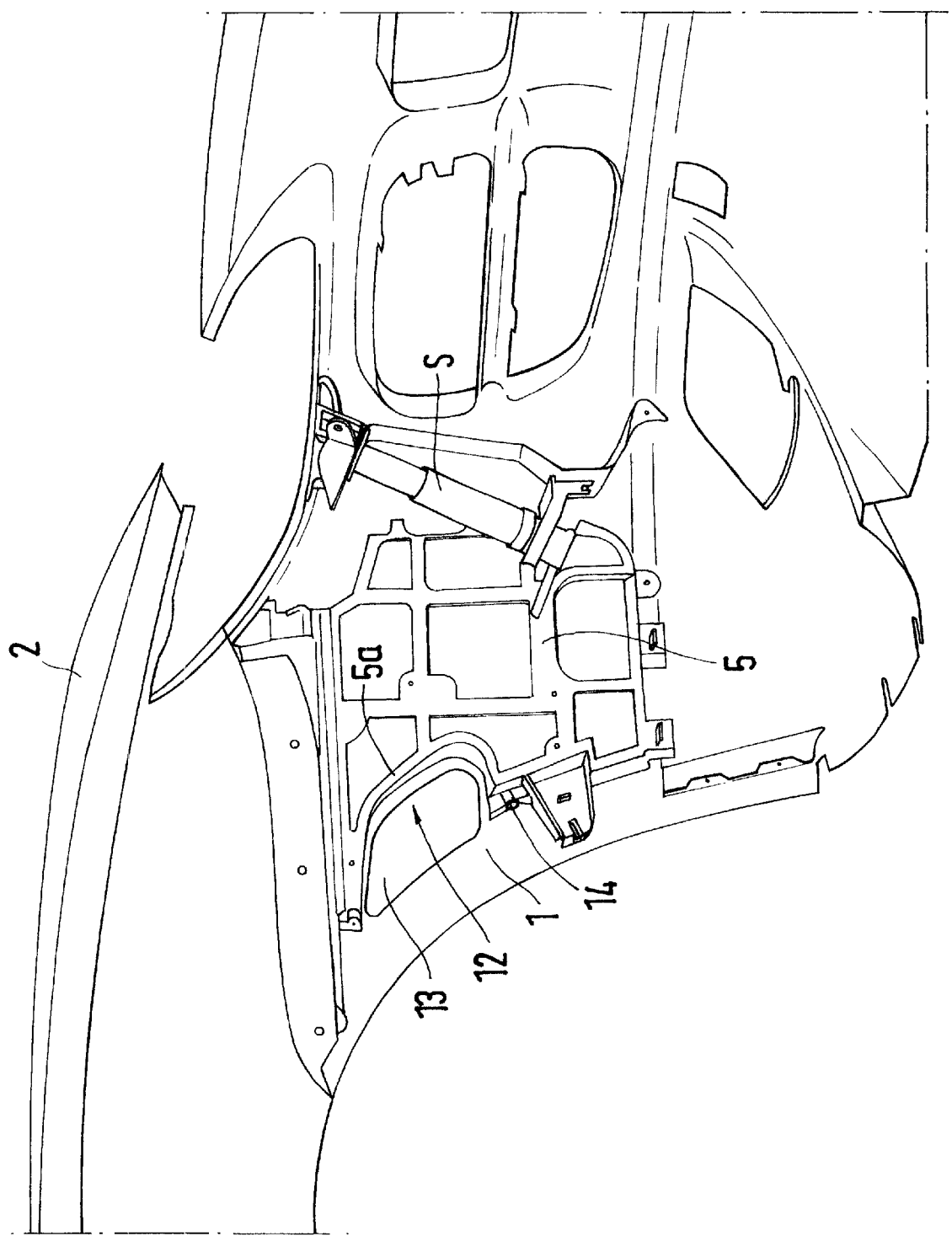
FIG. 5 is an overall view with the structural support component mounted on the side component of the front end panel.
Figure 6:
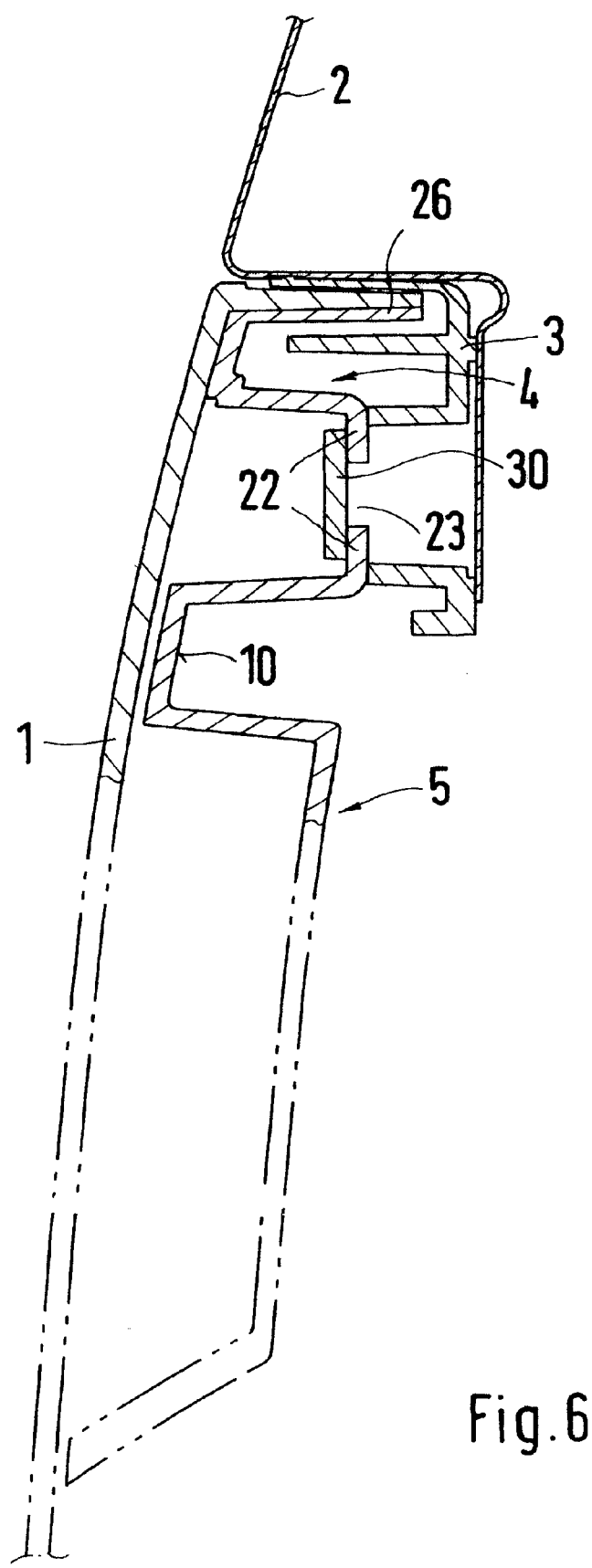
FIG. 6 is a cross section of the guide rail and the mounting profile, in the area of the clamping elements.

As can be seen from FIG. 1, the front/rear panel 1 is connected to a side component 2 and/or mounted to the fender of a vehicle. The means for connecting these components comprise essentially a strip-type guide rail 3 on the side component 2 and a strip-type mounting profile 4 on a structural support component 5, which can be connected to the front end panel 1.

To minimize the weight, the structural support component 5 has a grid structure with an integrated strip-type mounting profile section 4, which has a cross section in the form of a U-shaped part. This mounting profile 4 is at an upper end of the structural support component 5 and is connected at its outer leg 26 to an angled section 1a of the front end panel 1, e.g. via spot welding. The structural support component 5 is also mounted to the front panel 1 at the lower edge R2, via fusable projections V that become engaged in slits in tabs 9a, 9b of the structural support component 5 and via a bracket 32, as shown in FIG. 4. The front of the structural support component 5 is supported by a projecting rib 9 on the front panel. The structural support component 5 is largely open to the inner surface of the front panel 1, with essentially only one crosspiece 10 of the mounting profile 4 resting against it.

A housing 11 for a directional signal, a cable bundle K, and a headlight washer/wiper assembly S may be attached to the structural support component.

To hold the housing 11, the structural support component 5 has a partially enclosed opening 12, which corresponds to an outer opening 13 in the front panel 1 and is partially supported by a cross piece 5a of the structural support component 5. The housing 11 is connected to the structural support component 5 via two mounting projections 14, 15, via which the housing 11 can be secured using screws. The cable bundle K is attached to the structural support component 5 via at least two screw mounts 16, 17. The headlight washer/wiper assembly S is mounted on the structural support component 5 via at least one bracket 18.

Figure 7:
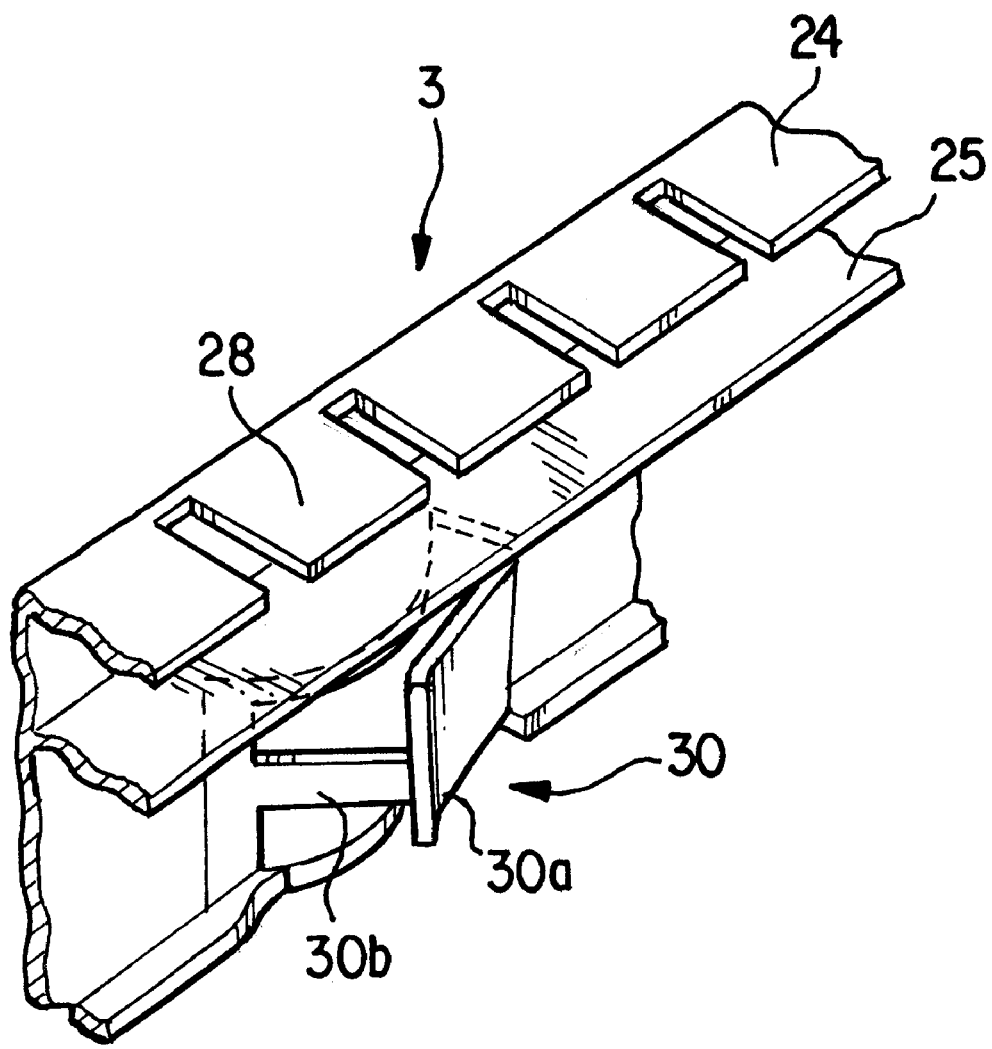
FIG. 7 is a section of a guide rail with a mounting element, wherein one of the legs has tabs.

The mounting profile 4 is provided on the inside of the crosspiece 10 with clamping brackets 20, 21, which have projecting angular surfaces 22 with longitudinal slits 23, as shown in FIG. 4. When assembled, the guide rail 3 is positioned opposite this mounting profile 4 on the front panel 1, as shown in FIG. 2. The guide rail 3 holds the outer leg 26 of the mounting profile 4, with the bent section 1a of the front panel 1, between two legs 24, 25. Alternatively, as shown in FIG. 7, one leg 24 may include a number of tabs 28, and the other lea 25 may be a continuous lea. The outer lea 26 of the mounting profile 5 and the bent section la of the front/rear panel 1 may be held between the tabs 28 and the continuous lea 25. Further, both leas 24, 25 may include tabs. The direct attachment of the guide rail 3 to the clamping brackets 20, 21 in the mounting profile 4 is achieved using catches positioned to correspond to the clamping brackets 20, 21, which are inserted into the brackets 20, 21 and held there in a clamping connection.

The mounting of the front panel 1 to the side component 2 is achieved by sliding the front panel 1 onto the guide rails 3 of the side component 2, and clamping it in place. On the inside of the side component 2, a wheel housing liner is mounted on the structural support component 5 via connecting brackets 31, 32.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A seating and mounting device for a vehicle's front or rear panel which is mountable on a side component of the vehicle using a strip-type guide rail, the device comprising an inner structural support component of the front or rear panel;

an integrated, strip-type mounting profile on an upper edge of the front or rear panel for mounting to the side component;

connecting brackets for a wheel housing liner on a surface of the front or rear panel;

mounting projections for a housing for a directional signal on an inner section of the structural support component;

a bracket for a headlight washer/wiper assembly; and screw mounts for cable bundles.

2. The device in accordance with claim 1, wherein the structural support component is connectable to the upper edge of the front or rear panel using the mounting profile and to a lower edge of the front or rear panel via tabs and a mounting bracket, and wherein the structural support component is positioned largely separate from an inner surface of the front or rear panel.

3. The device in accordance with claim 1, wherein the mounting profile is U-shaped in its cross section and extends at least over a length of the structural support component, wherein an outer leg of the mounting profile is connected to a bent section of the front or rear panel, wherein a crosspiece of the mounting profile lies flat against the side component, and wherein the structural support component is held and fastened at a lower edge of the front/rear panel via tabs on fusable projections in the side component.

4. The device in accordance with claim 3, wherein the crosspiece of the mounting profile includes at least two projecting clamping brackets having projecting angular surfaces with longitudinal slits, and the guide rail of the side component includes corresponding clamping elements and is insertable into the clamping brackets.

5. The device in accordance with claim 4, wherein each clamping element with includes a tongue that is formed on a projecting crosspiece and is oriented at an angle, and a relative position of the angle corresponds to a relative position of an angular surface of one of the clamping brackets.

6. The device in accordance with claim 4, wherein the guide rail includes opposing legs that hold between them the outer leg of the mounting profile and the bent section of the front or rear panel.

7. The device in accordance with claim 6, wherein at least one of the legs comprises a number of tabs positioned opposite a continuous leg, and the outer leg of the mounting profile and the bent section of the front or rear panel are held between the tabs and the continuous leg.

8. The device in accordance with claim 1, wherein an end of the structural support component is supported against a projecting rib of the front or rear panel, with a bracket for the wheel housing lining, and the wheel housing lining and the structural support component are attachable to the projecting rib using at least one mounting screw.

9. The device in accordance with claim 1, wherein the structural support component includes an opening that corresponds to an opening of the front or rear panel, wherein the opening of the structural support component is partially enclosed by a crosspiece of the structural support component, wherein the housing for the directional signal is placed in the opening of the structural support component, and wherein the housing is attached via two mounting projections to the structural support component using screws.

10. The device in accordance with claim 1, wherein the cable bundles are attached to the structural support component via at least two screw mounts.

11. A device for seating and mounting one of front and rear panels of a vehicle to a side component of the vehicle using a strip-type guide rail, comprising:
a structural support component including an integrated, strip-type mounting profile at an upper edge of the structural support component, mounting projections for a housing of a directional signal on an inner section of the structural support component, a bracket for a headlight washer/wiper assembly, and screw mounts for cable bundles.

12. The device in accordance with claim 11, wherein the structural support component is connected to the panel at the upper edge of the structural support component using the mounting profile and at a lower edge of the structural support component using tabs and a bracket, and wherein the structural support component is positioned largely separate from an inner surface of the panel.

13. The device in accordance with claim 11, wherein the mounting profile is U-shaped in cross section and extends along an length of the structural support component, wherein the mounting profile has an outer leg connected to a bent section of the panel, and wherein the structural support component includes a crosspiece lying flat against the side component, and the lower edge of the structural support component is held against and fastened to the panel using tabs on fusable projections of the side component.

14. The device in accordance with claim 13, wherein the guide rail includes two clamping elements, wherein the crosspiece of the mounting profile has two projecting clamping brackets, each bracket including a projecting angular surface having a longitudinal slit, and wherein each of the clamping element is insertable into one of the clamping brackets.

15. The device in accordance with claim 13, wherein the guide rail includes opposing legs, and wherein that the outer leg of the mounting profile and the bent section of the panel are positioned between the opposing legs.

16. The device in accordance with claim 15, wherein at least one of the legs comprises a number of tabs positioned opposite one of the legs, and wherein the outer leg 26 of the mounting profile and the bent section of the panel are held between the tabs and the continuous leg.

17. The device in accordance with claim 11, wherein the structural support component has an opening that corresponds to an outer opening of the panel, and the housing for the directional signal is placed in the opening of the structural support component.

18. A method for seating and mounting one of front and rear panels of a vehicle to a side component of the vehicle having a strip-type guide rail, comprising:
mounting the panel to the side component using a structural support component including an integrated, strip-type mounting profile at an upper edge of the structural support component;
mounting a housing of a directional signal on an inner section of the structural support component;
mounting a headlight washer/wiper assembly on a bracket of the structural support component; and
mounting cable bundles on screw mounts of the structural support component.

19. The method in accordance with claim 18, comprising:
connecting the structural support component to the panel at the upper edge of the structural support component using the mounting profile and at a lower edge of the structural support component using tabs and a bracket; and
positioning the structural support component largely separate from an inner surface of the panel.

20. The method in accordance with claim 18, comprising:
connecting an outer leg of the mounting profile to a bent section of the panel, and positioning the outer leg and the bent section between opposing legs of the guide rail.

21. The method in accordance with claim 18, comprising:
inserting a clamping element of the guide rail into a clamping bracket of the crosspiece.

22. The method in accordance with claim 18, comprising:
placing the housing in an opening of the structural support component and in an outer opening in the panel.

* * * * *